United States Patent Office 3,346,228
Patented Oct. 10, 1967

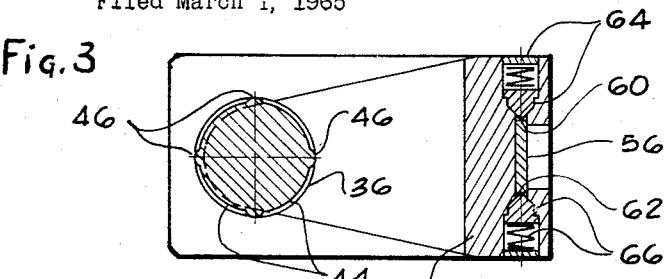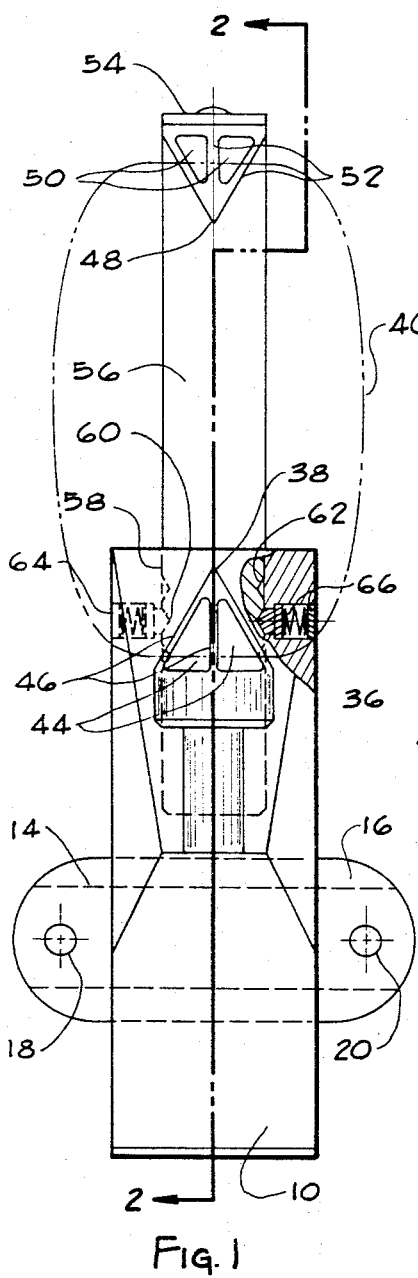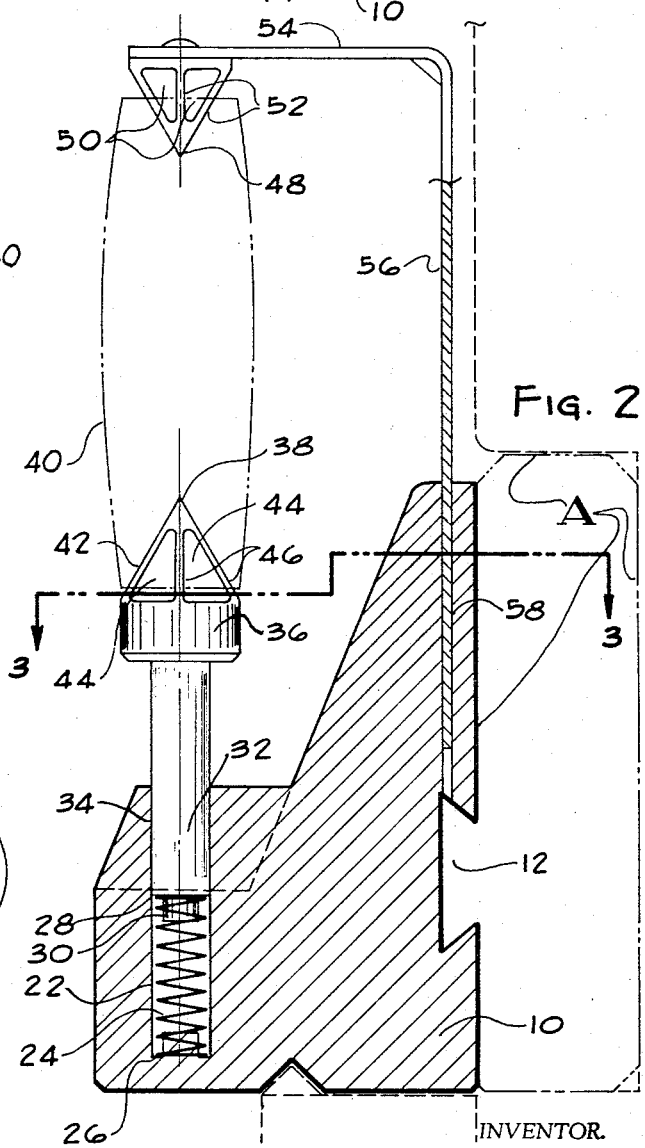

3,346,228
SOAP CAKE HOLDER
Richard F. Thorman, 3646 N. 37th St.,
Phoenix, Ariz. 85018
Filed Mar. 1, 1965, Ser. No. 435,951
4 Claims. (Cl. 248—316)

This invention relates to a soap cake holder and more particularly to a soap cake holder, which is adapted to support a soap cake securely at opposite ends and in such disposition that opposite sides of the soap cake are held generally in a vertical position to prevent undue moisture retention on the surfaces of the soap cake when not in use.

Various prior art devices have been used to hold soap cakes and to prevent undue moisture retention in soap cakes when not in use, however, these devices comprise structural arrangements which are either difficult to operate or tend to damage soap cakes or lack a secure holding facility therefor.

Some prior art devices are not efficient in holding soap cakes due to the fact that soap cakes, immediately after use, are very slippery and require positive holding devices for retaining soap cakes in certain disposition for drying.

Accordingly, it is an object of the present invention to provide a novel soap cake holder comprising substantially vertically aligned pointed soap cake holders disposed to make point contact with a soap cake at opposite ends thereof for holding the soap cake at its opposite sides vertically disposed to thereby hold the soap cake in such position that a minimum area thereof is subject to collection of moisture which tends to drain downwardly on the surfaces of the cake after it has been used.

Another object of the invention is to provide relatively spring loaded pointed soap holding members, substantially aligned on a common vertical axis and having moisture relief slots extending nearer to the ends of the pointed holders to thereby provide moisture relief passages when the pointed holders are embedded in the surfaces of a soap cake.

Another object of the invention is to provide a soap cake holder having a pair of pointed soap cake holders opposed to each other and carried by a frame disposed to provide for adjustment of the pointed holders toward and away from each other and also means spring loading one of the pointed holders toward the other to thereby accommodate various sized soap cakes and also to accommodate soap cakes as they are gradually used.

Another object of the invention is to provide a soap cake holder which is very simple and easy to use, very efficient in holding slippery soap cakes and which provides a minimum of contact area for securely holding a soap cake in such position that it will be readily dried after use without collecting an undue amount of moisture in any area thereof.

Further objects and advantages of the invention may be apparent from the following specification, appended claims and accompanying drawings, in which:

FIG. 1 is a front elevational view of a soap cake holder in accordance with the present invention showing portions thereof broken away and in section to amplify the illustration;

FIG. 2 is a sectional view taken from the line 2—2 of FIG. 1; and

FIG. 3 is a plan sectional view taken from the line 3—3 of FIG. 2.

As shown in FIGS. 1 and 2 of the drawings, the soap cake holder of the present invention is provided with a frame 10, which may be secured to a wall or other surface, such as a conventional shower stall soap tray or any other convenient location.

This frame 10 is provided with a dovetail mounting slot 12 in its rear side and oppositely extending tabs 14 and 16 having openings 18 and 20 through which screws, bolts or other fixtures may be disposed to hold the frame 10 in juxtaposition with relation to a desired object or location.

The dovetailed slot 12 may be used to receive a complemental male dovetail portion of a wall tile, as indicated by broken lines A in FIG. 2 of the drawings.

The frame 10 is provided with a substantially vertical bore 22 in which a spring 24 is disposed. This spring 24 is abutted at 26 in a bottom portion of the bore 22 and an upper end portion 28 of the spring surrounds a pilot 30 of a plunger 32, which is reciprocally mounted in an upper portion 34 of the bore 22, thus, the plunger 32 is vertically reciprocally mounted in the upper portion 34 of the bore 22 and is urged upwardly by means of the spring 24.

The plunger 32 is provided with a head portion 36 having an upwardly directed pointed end 38 adapted to engage a lower portion of a soap cake, indicated by broken lines 40.

The head 36 is provided with a conical portion 42 terminating in the pointed portion 38 and a plurality of recesses 44 are disposed in the outer surfaces of the head 36 and extend close to the point 38, so that outwardly extending rib portions 46 tend to bear against the soap cake 40 and permit drainage therebetween through the recesses 44.

A second pointed soap cake holding member 48 is provided with a conical pointed structure directed downwardly in opposed relation to the upwardly directed point 38 of the soap cake holder 36. This downwardly directed pointed soap cake holder 48 is provided with recesses 50 similar to the recesses 44 of the pointed holder 38, hereinbefore described. The recesses 50 are divided by ribs 52 which bear upon the soap cake in the similar manner to the ribs 46 hereinbefore described.

The pointed soap cake holder 48 is secured to a cantilevered bracket 54 having a vertical strap portion 56 reciprocally mounted in a vertical slot 58 in the frame 10. The portion 58 of the bracket 54 is provided with opposed notch portions 60 and 62 in opposite edges thereof, as shown best in FIGS. 1 and 3 of the drawings.

Spring loaded detents 64 and 66 are mounted in the frame 10 in opposed relationship to each other and frictionally engageable with the respective notch portions 58 and 62 for holding the bracket 54 in various adjusted vertical positions with respect to the frame 10.

In operation, the bracket 54 is adjusted to a suitable vertical position with respect to the frame 10 so that a soap cake, as indicated by broken lines 40, may be disposed between the pointed holder points 38 and 48 with a slight pre-load against the soap cake as imposed by compression of the spring 24.

It will be seen from the drawings that the detents 64 and 66 in engagement with any one of the pairs of notches 60 and 62, respetcively, spaced longitudinally of the vertical portion 56 of the bracket 54 provide for basic adjustment of the holder for soap cakes of various sizes, while the compression of the spring 24 provides for normal shrinkage and usage of a given soap cake over the expected life of such a soap cake.

The pointed holders 38 and 48 having the recesses 44 and 50, respectively, permit drainage of moisture from the immediate contact area of the points 38 and 48 with the soap cake, and the vertical alignment of these pointed holders 38 and 48 permits a soap cake to be supported in a vertical position such that opposite sides of the soap cake are disposed vertically and only one end is subject to collection of moisture by drainage and this end is held by the point 38 in such a manner that only the ribs 42 contact the soap and permit water or moisture to drain from the soap cake through the recessed areas 44.

It will be obvious to those skilled in the art that various modifications of the present invention may be resorted to in a manner limited only by a just interpretation of the following claims.

I claim:

1. In a soap cake holder the combination of: a frame; a pair of substantially vertically aligned opposed pointed soap cake holders disposed in spaced relationship to each other and supported on said frame; and resilient means tending to urge one of said pointed holders directly toward the other pointed holder, said points being vertically aligned to permit drainage from a soap cake held between said vertically aligned points.

2. In a soap cake holder the combination of: a frame; a pair of substantially vertically aligned opposed pointed soap cake holders disposed in spaced relationship to each other and supported on said frame; and resilient means tending to urge one of said pointed holders directly toward the other pointed holder, said points being vertically aligned to permit drainage from a soap cake held between said vertically aligned points; a portion of said frame adjustably mounted to extend one of said pointed holders relative to the other.

3. In a soap cake holder the combination of: a frame; a pair of substantially vertically aligned opposed pointed soap cake holders disposed in spaced relationship to each other and supported on said frame; and resilient means tending to urge one of said pointed holders directly toward the other pointed holder; a portion of said frame adjustably mounted to extend one of said pointed holders relative to the other; said last mentioned portion having spaced detent means thereon; and complemental detent means on the remaining portion of said frame to thereby provide basic detent adjustment of one of said pointed holders relative to the other.

4. In a soap cake holder the combination of: a frame; a pair of substantially vertically aligned opposed pointed soap cake holders disposed in spaced relationship to each other and supported on said frame; and resilient means tending to urge one of said pointed holders directly toward the other pointed holder; said pointed holders generally conical in shape and terminating in a point; and outer conical surfaces of said holders having recesses and intermediate rib structures whereby the rib structures engage a soap cake and the recesses provide for drainage therebetween.

References Cited

UNITED STATES PATENTS

| | | | |
|---|---|---|---|
| 1,295,120 | 2/1919 | Cartre | 248—313 X |
| 2,120,599 | 6/1938 | Brown. | |
| 2,673,058 | 3/1954 | Tyler | 248—313 |
| 2,931,516 | 4/1960 | Sharp | 248—316 X |

FOREIGN PATENTS

| | | |
|---|---|---|
| 967,597 | 6/1948 | France. |
| 13,657 | 1906 | Great Britain. |

ROY D. FRAZIER, *Primary Examiner.*

CLAUDE A. LE ROY, *Examiner.*

J. F. FOSS, *Assistant Examiner.*